(12) United States Patent
Cernusca et al.

(10) Patent No.: US 6,671,493 B2
(45) Date of Patent: Dec. 30, 2003

(54) DATA CARRIER DESIGNED FOR CONTACTLESS COMMUNICATION AND HAVING DETECTION MEANS FOR DETECTING A TEMPERATURE PREVAILING IN THE DATA CARRIER

(75) Inventors: Michael Cernusca, Judendorf (AT); Stefan Posch, Graz (AT); Josef Preishuber-Pfluegl, Graz (AT); Peter Thueringer, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 53 days.

(21) Appl. No.: 10/181,082
(22) PCT Filed: Nov. 16, 2001
(86) PCT No.: PCT/EP01/13419
§ 371 (c)(1), (2), (4) Date: Jul. 12, 2002
(87) PCT Pub. No.: WO02/41238
PCT Pub. Date: May 23, 2002

(65) Prior Publication Data
US 2003/0003870 A1 Jan. 2, 2003

(30) Foreign Application Priority Data
Nov. 20, 2000 (EP) .......................... 00890344

(51) Int. Cl.$^7$ .............................................. H04B 5/00
(52) U.S. Cl. .......................................... 455/41; 455/73
(58) Field of Search .......................... 455/41, 73, 106; 342/44–51; 235/382

(56) References Cited

U.S. PATENT DOCUMENTS

| 6,321,067 B1 | * | 11/2001 | Suga et al. ............. 455/41 |
| 6,367,266 B1 | * | 4/2002 | Kobayashi et al. ............. 455/41 |
| 6,427,065 B1 | * | 7/2002 | Suga et al. ............. 455/41 |
| 6,480,699 B1 | * | 11/2002 | Lovoi ............. 455/41 |

FOREIGN PATENT DOCUMENTS

| FR | 2782209 | 8/1998 | ............. H04B/5/00 |
| WO | WO09957681 | 4/1999 | ............. G06K/19/07 |

* cited by examiner

Primary Examiner—Nay Maung
(74) Attorney, Agent, or Firm—Steven R. Biren

(57) ABSTRACT

A data carrier (1) for contactless communication with a communication station (2) has an integrated circuit (7) and has a direct voltage generation circuit (20), and has detection means (28) for detecting a temperature prevailing in the data carrier (1) and in the integrated circuit (7), with the aid of which detection means (28) a representation signal (RS) representative of the prevailing temperature can be generated, which representation signal causes an initiation of a change of the temperature in the data carrier (1) and in the integrated circuit (7).

11 Claims, 2 Drawing Sheets

US 6,671,493 B2

DATA CARRIER DESIGNED FOR CONTACTLESS COMMUNICATION AND HAVING DETECTION MEANS FOR DETECTING A TEMPERATURE PREVAILING IN THE DATA CARRIER

FIELD OF THE INVENTION

The invention relates to a data carrier for the contactless communication with a communication station designed for this, and to a communication station for the contactless communication with a data carrier designed for this, as well as to an integrated circuit for a data carrier for the contactless communication with a communication station designed for this.

BACKGROUND OF THE INVENTION

Such a data carrier and such an integrated circuit as well as such a communication station are described in, for example, the patent document WO 99/57681 A1 and are consequently known. The known data carrier has an integrated circuit by means of which, in addition to other circuit sections, a direct voltage generation circuit is realized, which circuit includes a rectifier stage further includes voltage limiting means, with the aid of which the d.c. supply voltage which can be generated with the aid of the direct voltage generation circuit can be limited to a maximum value, when necessary. Such a limitation is necessary, for example, when a data carrier is situated close to a communication station and is thus situated in an area with a high field strength of a communication fields that can be generated by the communication station, because in the absence of the voltage limiting means the high field strength would result in an excessive d.c. supply voltage on the output of the direct voltage generation circuit. The operation of the direct voltage generation circuit and, particularly, the operation of the voltage limiting means leads to generation of heat in the known data carrier, which results in a temperature rise in the known data carrier. Such a temperature rise has only comparatively insignificant consequences when the integrated circuit, by means of which both the direct voltage generation circuit and the voltage limiting means are realized, has a comparatively large surface area and can therefore handle comparatively large temperature rises. However, such temperature rises pose a problem when an integrated circuit for a data carrier adapted to provide contactless communication with a communication station is miniaturized to a higher degree than in the case of the aforementioned prior-art solution, i.e. is to be realized on a smaller chip area, because as a result of such temperature rises there is a risk that at least a part of the integrated circuit is damaged or even destroyed owing to excessively high temperatures.

BRIEF SUMMARY OF THE INVENTION

It is an object of the invention to preclude the risk of adverse effects on a data carrier and on an integrated circuit in the case of further miniaturization of the data carrier and of the integrated circuit even in operational situations in which comparatively large temperature variations occur during operation, which without the provision of the measures in accordance with the invention would lead to operating temperatures outside a given permissible range of operating temperatures in the data carrier and in the integrated circuit.

In order to achieve the aforementioned object, characteristic features in accordance with the invention are provided in a data carrier in accordance with the invention, in such a manner that a data carrier in accordance with the invention can be characterized in the manner defined hereinafter, namely:

A data carrier adapted to provide contactless communication with a communication station and including an integrated circuit and including a direct voltage generation circuit, which serves to generate and to supply a d.c. supply voltage for the data carrier, and including detection means for detecting the temperature prevailing in the environment of the detection means in the data carrier, with the aid of which detection means a representation signal representative of the prevailing temperature can be generated, and including initiation means adapted to receive and to process the representation signal and adapted to initiate a change of the temperature in the data carrier.

In order to achieve the aforementioned object, characteristic features in accordance with the invention are provided in an integrated circuit in accordance with the invention, in such a manner that an integrated circuit in accordance with the invention can be characterized in the manner defined hereinafter, namely:

An integrated circuit for a data carrier for providing contactless communication with a communication station, including a direct voltage generation circuit, which serves to generate and to supply a d.c. supply voltage for the integrated circuit, and including detection means for detecting the temperature prevailing in the environment of the detection means in the integrated circuit, with the aid of which detection means a representation signal representative of the prevailing temperature can be generated, and including initiation means adapted to receive and to process the representation signal and adapted to initiate a change of the temperature in the integrated circuit.

As a result of the provision of the characteristic features in accordance with the invention it is achieved in a comparatively simple manner and with only low additional cost that the temperature in a data carrier and in an integrated circuit for such a data carrier can be changed, i.e. increased or reduced depending on the situation, so as to keep the operating temperature in the data carrier and the integrated circuit within a desired specified range of operating temperatures.

In a data carrier in accordance with the invention and in an integrated circuit in accordance with the invention the initiation means may be adapted to initiate a temperature increase, which may be required for example when a data carrier in accordance with the invention and an integrated circuit in accordance with the invention should operate correctly in deep-freeze environment. However, it has proved to be particularly advantageous when the initiation means are adapted to initiate a reduction of the temperature in the data carrier and in the integrated circuit. This is of particular advantage because in a number of uses of a data carrier and an integrated circuit for such a data carrier a comparatively strong heating may occur, particularly when the integrated circuit should be realized on a minimal chip area, an undesired temperature rise then being precluded with the aid of the measures in accordance with the invention.

In a data carrier in accordance with the invention and in an integrated circuit in accordance with the invention the temperature can be influenced with the aid of an input resistance of an input circuit because the energy received and further processed by a data carrier in the range of operation in which a temperature change, for example a temperature rise, is possible, is proportional to the input resistance of an input circuit and can consequently the energy input can be changed by changing the input resistance, which results in a change of the temperature in the data carrier and in the integrated circuit.

In a data carrier in accordance with the invention and in an integrated circuit in accordance with the invention it is also possible to use a transmission resonant circuit, provided in such a data carrier for receiving a communication signal transmitted to the data carrier by a communication station, for changing the temperature, which is possible because the energy input by means of such a transmission resonant circuit depends on the resonant frequency of the transmission resonant circuit, as a result of which the energy input into a data carrier can be changed in a comparatively simple manner by changing the resonant frequency of the transmission resonant circuit, which leads to a change of the temperature prevailing in the data carrier and in its integrated circuit. For changing the resonant frequency of the transmission resonant circuit use can be made of capacitors which can be switched into and out of the transmission resonant circuit. Changing the resonant frequency may alternatively be effected by switching inductances into or out of the circuit.

However, with a data carrier in accordance with the invention and an integrated circuit in accordance with the invention it has also proved to be very advantageous when the initiation means are adapted to support the transmission of a transmission signal, which corresponds to the representation signal representative of the temperature prevailing in the data carrier and in the integrated circuit, from the data carrier to a communication station. This embodiment has the advantage that the change of the temperature prevailing in the data carrier and in the integrated circuit is initiated in the data carrier and in the integrated circuit but that the means for changing the temperature in the data carrier and in the integrated circuit are not included in the data carrier or the integrated circuit but in the communication station which is adapted to provide contactless communication with the data carrier and the integrated circuit.

In the above context it has proved to be very advantageous when a communication station in accordance with the invention includes station processing means for processing the transmission signal transmitted by the data carrier and received by the communication station and further includes control means which can be influenced by the station processing means and with the aid of which the energy content of a communication signal transmitted from the communication station to the data carrier can be changed. This has the advantage that the measures for changing the temperature in a data carrier in accordance with the invention and in an integrated circuit in accordance with the invention are implemented in the communication station in accordance with the invention, which has the advantage that, if required, substantially more expensive and more intricate means and measures for changing the temperature in a data carrier and in an integrated circuit can be realized in a comparatively cheap manner.

The above-mentioned as well as further aspects of the invention will become apparent from the embodiments described hereinafter by way of example and will be elucidated with reference to these examples.

The invention will now be described in more detail with reference to the drawings, which show four embodiments which are given by way of example but to which the invention is not limited.

DETAILED DESCRIPTION OF THE INVENTION

Figure 1:
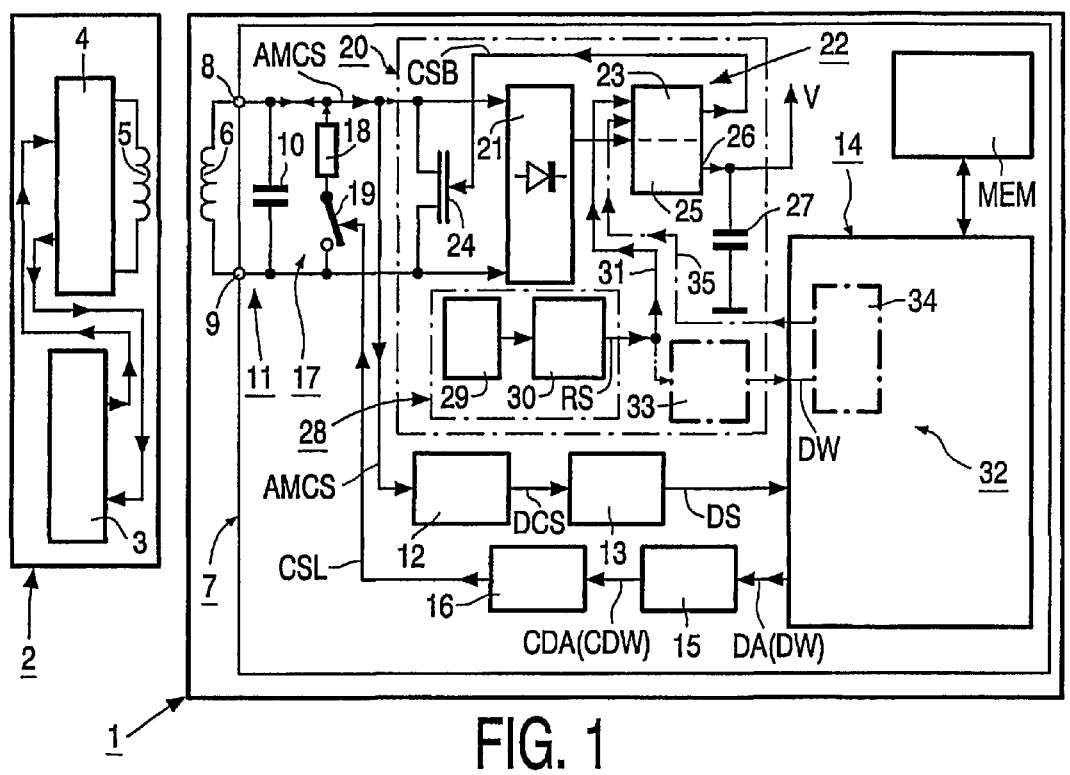
FIG. 1 is a block diagram which schematically shows a relevant part of a data carrier and its integrated circuit in accordance with a first embodiment of the invention as well as a communication station provided for cooperation with the data carrier.

FIG. 1 shows a data carrier 1 adapted to provide contactless communication with a communication station 2.

The communication station 2 includes a station data processing device 3, which includes a station control unit, which is realized by means of a microcomputer but which may alternatively be formed by a hard-wired logic circuit. The communication station 2 further includes transmitting and receiving means 4 connected to the station data processing device 3, as a result of which it is possible to transmit data from the station data processing device 3 to the transmitting and receiving means 4 as well as from the transmitting and receiving means 4 to the station data processing device 3. The communication station 2 further includes a station transmission coil 5, which is connected to the transmitting and receiving means 4 and with the aid of which a contactless communication with a transmission coil of the data carrier 1 is possible, this contactless communication being effected in an inductive manner.

The data carrier 1 has a transmission coil 6 which serves to and is adapted cooperate inductively with the station transmission coil 5 of the communication station 2. The data carrier 1 further includes an integrated circuit 7. The integrated circuit 7 has a first terminal 8 and second terminal 9. The transmission coil 6 is connected to the two terminals 8 and 9. The integrated circuit 7 includes a capacitor 10 arranged in parallel with the two terminals 8 and 9. The capacitor 10 forms a main component of a transmission resonant circuit 11. The transmission resonant circuit 11 serves to receive a communication signal AMCS, the communication signal AMCS being an amplitude-modulated communication signal. The transmission resonant circuit 11 is tuned to a resonant frequency, which in known manner corresponds at least substantially to the frequency of a carrier signal which can be generated in the communication station 2 and which is amplitude-modulated for the purpose of data transmission, as a result of which said amplitude-modulated communication signal AMCS is formed.

The integrated circuit 7 includes amplitude demodulation means connected to the transmission coil 6. The amplitude demodulation means 12 enable the received amplitude-modulated communication signal AMCS to be demodulated, the amplitude demodulation means 12 supplying a demodulated communication signal DCS after a demodulation. The integrated circuit 1 further includes decoding means 13, which are arranged after the amplitude demodulation means 12 and to which the demodulated communication signal DCS can be applied and which decode this signal, as a result of which the decoding means 13 can supply a decoded signal DS.

The integrated circuit 7 further includes a data processing device 14, which includes a control unit, which is not shown and which is realized with the aid of a microcomputer but which may alternatively be realized by means of a hard-wired logic circuit. The decoded signal supplied by the decoding means 13 can be applied to the data processing device 14 in order to be processed in the data processing device 14. The data processing device 14 cooperates with a memory MEM, the data processing device 14 and the control unit included in said device enabling data to be read into the memory MEM and to be read out of the memory MEM.

The integrated circuit 7 further includes encoding means 15, which are connected to the data processing device 14 and to which data DA, for example a data word DW, can be applied by the data processing device 14 in order to transmit said data DA to the communication station 2. The encoding means 15 encode the applied data DA and after this encoding they supply encoded data CDA, for example an encoded data word CDW.

The integrated circuit 7 further includes a control signal generating circuit 16, to which the encoded data CDA or CDW can be applied by the encoding means 15. The control signal generating circuit 16 can generate a control signal CSL, which is available on an output of the control signal generating circuit 16. The integrated circuit 7 further includes a load modulation stage 17, which is arranged in parallel with the transmission resonant circuit 11 and which includes a resistor 18 and a switch 19, which is arranged in series with the resistor 18 and which is formed by a transistor. The switch 19 can be controlled with the aid of the control signal CSL supplied by the control signal generating circuit 16, thus enabling the switch 19 to be switched between its non-conductive state-shown in FIG. 1 and its conductive state, which results in a different load of the transmission resonant circuit 11 and thus in a load modulation of an unmodulated carrier signal generated by the communication station 2 and applied to the station transmission coil 5 of this station. In this way, a data transmission from the data carrier 1 to the communication station 2 is possible by load modulation of an unmodulated carrier signal.

The integrated circuit 7 further includes a direct voltage generation circuit 20, which serves to generate and to supply a d.c. supply voltage V for the data carrier 1 and for the integrated circuit 7. The d.c. supply voltage V can be applied to all circuit elements of the integrated circuit 7 which require this d.c. supply voltage, but this is not illustrated in FIG. 1 for in order achieve that the clarity of this Figure is not affected unduly. The direct voltage generation circuit 20 includes a rectifier stage 21. The direct voltage generation circuit 20 further includes a voltage limiting circuit 22, which consists of a control signal generating circuit 23 and of a parallel controller stage 24 formed by means of a FET and of series controller stage 25. Instead of the FET it is possible to use transistors of other types. The rectifier stage 21 is arranged in parallel with the transmission resonant circuit 11. The rectifier stage 21 derives from the electrical energy produced in the transmission resonant circuit 11, which is caused by the modulated or unmodulated carrier signal transmitted inductively from the communication station 2 to the transmission resonant circuit 11, a direct voltage, which is applied both to the control signal generating stage 23 and to the series controller stage 25. The control signal generating stage 23 generates a control signal CSB, which is applied to the control electrode of the FET forming the parallel controller stage 24 in order to control the latter. The parallel controller stage 24 formed by the FET constitutes an input circuit having an input resistance. The input resistance of the input circuit, i.e. of the parallel controller stage 24, can be changed with the aid of the control signal CSB, as a result of which the input resistance can be reduced by reducing the input resistance of the input stage, i.e. by reducing the resistance in the main current path of the FET, thereby enabling the energy supplied to the rectifier stage 21 to be reduced. Thus, a voltage limitation can be achieved by means of the control signal generating stage 23 and the parallel stage 24, when this is necessary. In addition, the direct voltage generation circuit 20 includes the series controller stage 25, which provides finer control than attainable with the parallel controller stage 24. The provision of such a parallel controller stage 24 and such a series controller stage 25 is known per se since some time from existing data carriers an existing integrated circuits. A buffer capacitor 27 is connected to the output 26 of the parallel controller stage 25. The generated d.c. supply voltage V is available across the buffer capacitor 27.

Advantageously, the data carrier 1 and the integrated circuit 7 of the data carrier 1 include detection means 28 for detecting the temperature prevailing in the environment of the detection means 28 in the data carrier 1 and in the integrated circuit 7. Advantageously, the detection means 28 are arrange in the proximity of the direct voltage generation circuit 20 and, particularly, in the proximity of the parallel controller stage 24 because in this area temperature rise in the integrated circuit 7 and in the data carrier 1 is largest as a result of the strong limiting action of the parallel controller stage 24 and the consequent dissipation of the applied energy.

The detection means 28 include a temperature sensor 29 and sensor signal processing means arranged after the temperature sensor 29. The temperature sensor 29 can be realized simply with the aid of a diode on which a constant current is impressed and whose diode voltage is temperature dependent in accordance with a known characteristic. Thus, the diode voltage represents the output signal of the temperature sensor 29, which is applied to the sensor signal processing means 30. Instead of by means of a diode, the temperature sensor 29 can be realized with the aid of a bipolar transistor whose temperature dependent base-emitter voltage forms the output signal of the temperature sensor 29, or with the aid of a CMOS transistor whose gate voltage forms the output signal of the temperature sensor 29.

Subsequently, a representation signal RS is generated with the aid of the sensor signal processing means 30 in dependence on the output signal of the temperature sensor 29, which representation signal is representative of the temperature prevailing in the environment of the detection means 28 and of the temperature sensor 29. The representation signal RS is applied to the control signal generating stage 23 of the voltage limiting circuit 22 via a connection 31. When the temperature rises, which is detected with the aid of the temperature sensor 29, such a representation signal RS is generated and applied to the control signal generating stage 23 that the control signal generating stage 23 produces a larger or stronger control signal CSB, as a result of which the FET forming the parallel controller stage 24 is driven into its low-resistance region and the limiting action of the parallel controller stage 24 is thus increased. This, in its turn, results in energy supplied to the rectifier stage 21 being limited, which counteracts the temperature rise in the integrated circuit 7. Since the parallel resistance is reduced because the FET is driven into its low-resistance region, the input voltage for the rectifier stage 21 becomes too small required for a satisfactory and correct power supply, but this is compensated for in that the part of the integrated circuit 7 after the series controller stage 25, which should be energized with the supply voltage V, are subsequently energized via the buffer capacitor 27, which buffer capacitor 27 ensures that an adequate supply voltage V is sustained, which is required inter alia for the control of the FET forming the parallel controller stage 24. In order to obtain a comparatively long time in which an adequate power supply with the aid of a buffer capacitor 27 is guaranteed for a given capacitance of the buffer capacitor 27, it is advantageous to turn off parts of the integrated circuit 7 which are not needed in this operating situation, so as to avoid unnecessary loading of the buffer capacitor 27, or to connect the buffer capacitor 26 only to certain parts of the integrated circuit 7, which also leads to a reduction of the power drain from the buffer capacitor 27.

In the embodiment just described the control signal generating stage 23 forms initiation means adapted to receive and process the representation signal RS and adapted to initiate a change of the temperature in the data carrier 1 and in the integrated circuit 7.

A variant of the embodiment of the integrated circuit 7 described hereinbefore, which variant is shown in dash-dot lines in FIG. 1, includes initiation means 32 which, in addition to the control signal generating stage 32, include two further parts, namely an analog-to-digital converter 33, arranged after the sensor signal processing means 30 of the detection means 28, and data word processing means 34, realized with the aid of the data processing device 14. In this variant the representation signal RS can be applied to the analog-to-digital converter 33. The analog-to-digital converter 33 effects an analog-to-digital conversion and supplies a data word DW which corresponds to the representation signal RS and which is applied to the data word processing means 34. The data processing means 34 process the applied data word DW and supply a signal to the control signal generating stage 23 via a connection 35, which signal is processed in the control signal generating stage 23, and thus influence or change the control signal CSB supplied by the control signal generating stage 23 in such a manner that the resistance of the FET forming the parallel controller stage 24 is reduced when a temperature increase is detected by means of the temperature sensor 29.

Figure 2:
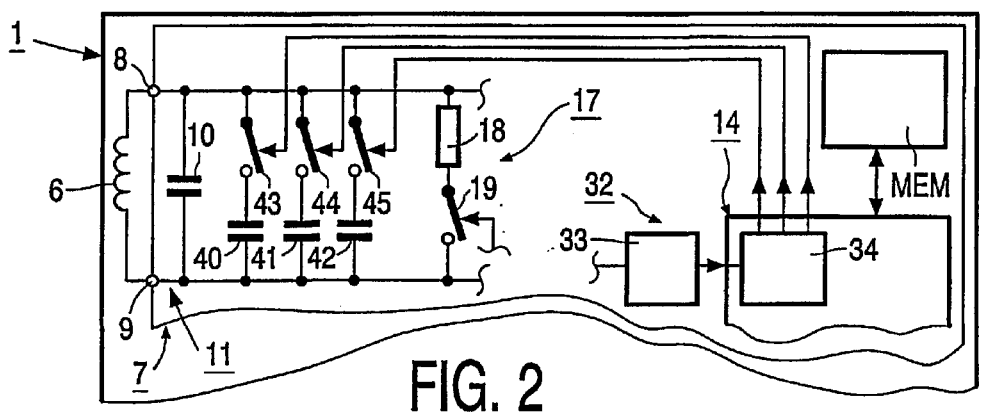
FIG. 2 shows, in a manner similar to FIG. 1, a part of a data carrier in accordance with a second embodiment of the invention.

FIG. 2 shows only a part of a data carrier 1 whose integrated circuit 7 includes, in addition to the capacitor 10 provided as a main component of the transmission resonant circuit 11, a first additional capacitor 40 and a second additional capacitor 41 as well as a third capacitor 42. A first switch 43 is arranged in series with the first additional capacitor 40. A second switch 44 is arranged in series with the second additional capacitor 41. A third switch 45 is arranged in series with the third additional capacitor 42. The three switches 43, 44 and 45 are realized with the aid of transistors. In the present case, the three switches 43, 44 and 45 can be controlled with the aid of the data word processing means 34 and can thus be switched between their non-conductive states, shown in FIG. 2, and their conductive states, not shown, as a result of which one or more of the additional capacitors 40, 41 and 42 can be arranged selectively in parallel with the capacitor 10. By selectively switching at least one additional capacitor into circuit the resonant frequency of the transmission resonant circuit 11 can be changed in a simple manner. Thus, it is again possible to change the energy absorbing capacity of the transmission resonant circuit 11. When a temperature increase in the data carrier of FIG. 2 is detected with the aid of detection means 28, not shown, the data word processing means 34 ensure that at least one of the three additional capacitors 40, 41 and 42 is connected to the capacitor 10 in dependence on the magnitude of the representation signal RS, which results in such a change of the frequency relationships in the transmission resonant circuit 11 that the transmission resonant circuit 11 can extract less power from the communication field generated with the aid of the communication station 2, which in its turn leads to a reduction of the temperature in the data carrier 1 and in its integrated circuit 7.

Figure 3:
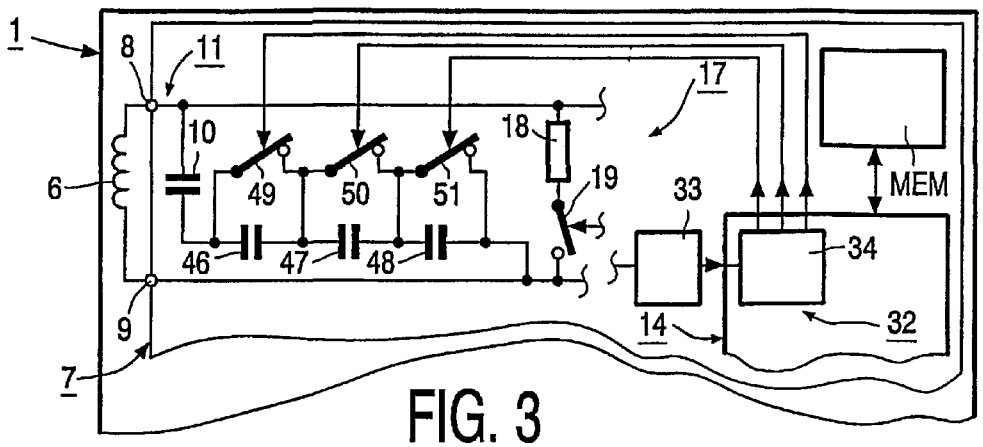
FIG. 3 shows, in a manner similar to FIG. 2, a part of a data carrier in accordance with a third embodiment of the invention.

The data carrier 1 shown in FIG. 3 is a variant of the data carrier 1 shown in FIG. 2. The data carrier 1 shown in FIG. 3 also includes three additional capacitors 46, 47 and 48 but in the present case these capacitors are arranged in series with the capacitor 10. The data carrier 1 shown in FIG. 3 also includes three switches 49, 50 and 51 each formed by a transistor, the first switch 49 being arranged in parallel with the first additional capacitor 46, and the second switch 50 being arranged in parallel with the second additional capacitor 47, and the third switch 51 being arranged in parallel with the third additional capacitor 48, the three switches 49, 50 and 51 forming a conductive connection in their rest conditions and being non-conductive in their operating conditions, which are brought about with the aid of the data word processing means 34.

The initiation means 32 in the two data carriers 1 shown in FIGS. 2 and 3 and in the integrated circuits 7 shown in FIGS. 2 and 3, which consist of the analog-to-digital converter 33, not shown, and of the data word processing means 34, are adapted to initiate a change of the resonant frequency of the transmission resonant circuit 11.

In the data carriers 1 shown in FIGS. 1, 2 and 3 and in the integrated circuits 7 shown in FIGS. 1, 2 and 3 not only the initiation of a change of the temperature prevailing in the data carrier 1 and in the integrated circuit 7 takes place in this data carrier 1 and in this integrated circuit 7. The data carrier 1 and the integrated circuit 7 also include the means and measures for changing the temperature prevailing in said data carrier 1 and said integrated circuit 7.

Another solution has been chosen for the data carrier 1 and the communication station 2 shown in FIG. 4, which will be described in more detail hereinafter.

Figure 4:
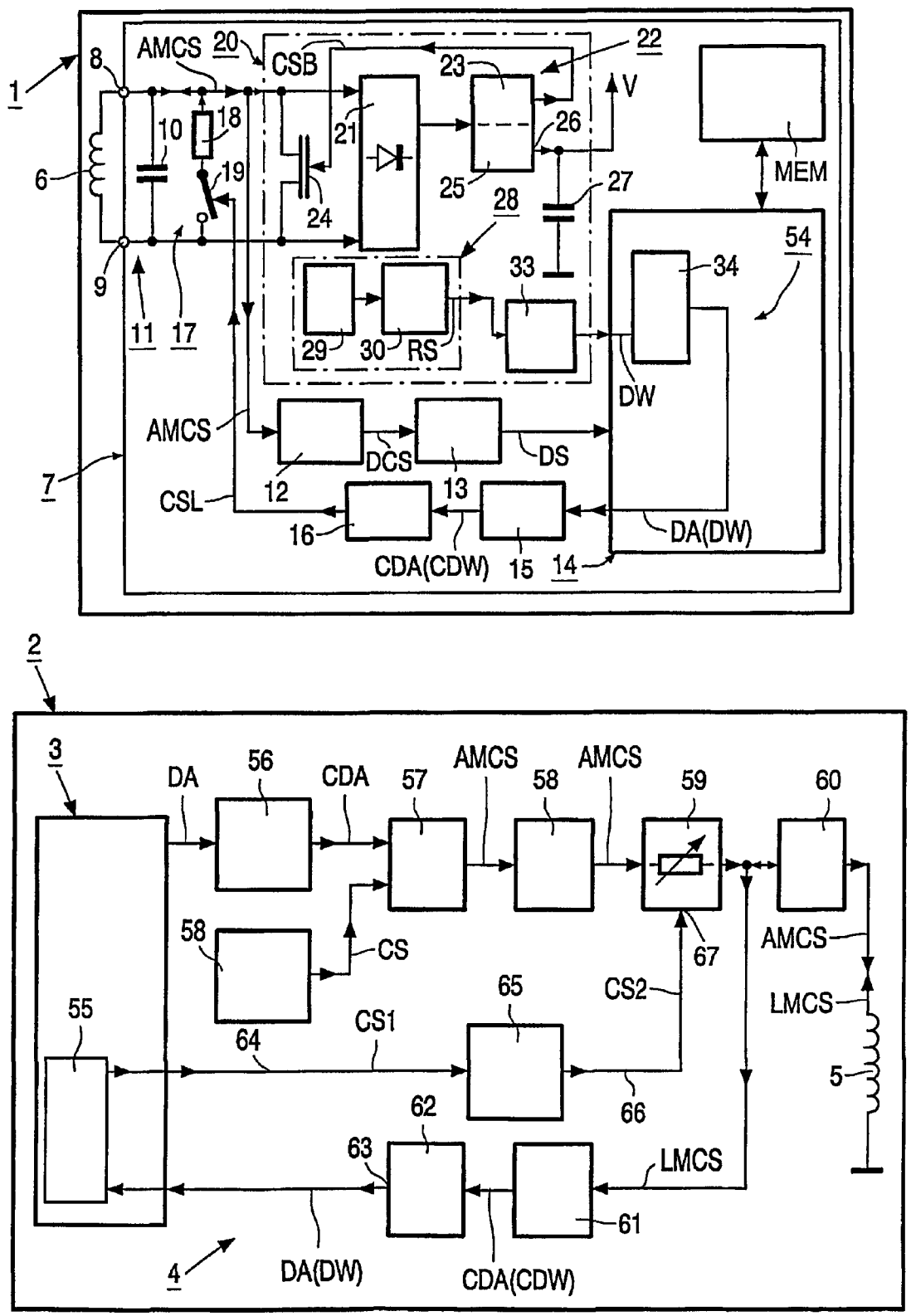
FIG. 4 shows, in a manner similar to FIG. 1, a part of a data carrier in accordance with a fourth embodiment of the invention as well as a communication station in accordance with an embodiment of the invention.

The data carrier 1 shown in FIG. 4, similarly to the data carriers 1 shown in FIGS. 1, 2 and 3, includes initiation means. The data carrier 1 shown in FIG. 4 includes initiation means 54, which consist of the analog-to-digital converter 33 and of the data word processing means 34 and of the encoding means 15 and of the control signal generating circuit 16 and of the load modulation stage 17 and of the transmission resonant circuit 11. The initiation means 54 are now adapted to support the transmission of a transmission signal corresponding to the representation signal RS, i.e. in the present case to support the transmission of the data word DW corresponding to the representation signal RS, from the data carrier 1, i.e. from its integrated circuit 7, to the communication station 2.

Apart from the initiation means 54 described hereinbefore, the data carrier 1 shown in FIG. 4 is of substantially the same design as the data carrier 1 shown in FIG. 1.

The communication station 2 shown in FIG. 2, which serves to cooperate with the data carrier 1 shown in FIG. 4, includes a station data processing device 3 which, as already described with reference to the communication station 2 shown in FIG. 1, includes a station control unit, which is neither shown in FIG. 4. The station data processing device 3 further includes station processing means 55, whose function will be described hereinafter.

The communication station 2 includes encoding means 56, to which data DA supplied by the station data processing device 3 can be applied and which decode said data DA and supply accordingly encoded data CDA. The data DA may represent, for example, commands. The communication station 2 further includes amplitude modulation means 57, which are arranged after the encoding means 56 and to which the encoded data CDA can be applied. The communication station 2 further includes a carrier signal generator 58, by means of which a carrier signal CS can be generated, which can likewise be applied to the amplitude modulation means 57. The amplitude modulation means 57 can effect an amplitude modulation of the carrier signal CS in dependence on the encoded data CDA, as a result of which the amplitude modulation means 57 supply an amplitude-modulated carrier signal AMCS. The amplitude-modulated carrier signal AMCS can be given a desired level with the aid of amplifier means 58. The amplifier means 58 are followed by controllable resistance means 59, with the aid of which a variable resistance, namely a variable output resistance of the amplifier means 58 is attainable. The controllable resistance means 59 now form control means with the aid of which the energy content of the communication signal transmitted from the communication station 2 to the data carrier AMCS, i.e. of the amplitude-modulated carrier signal AMCS, can be changed.

For the circuit design of the controllable resistance means 59 reference is made to the European patent application having the application number 99 890 280.3, reference being made to FIG. 6 and the corresponding description for the controllable resistance means 59. The disclosure of the European patent application just mentioned is incorporated herein by reference to said application.

The communication station 2 further includes matching means 60 arranged after the controllable resistance means 59. The matching means 60 perform a matching function between the controllable resistance means 59 and the station transmission coil 5 of the communication station 2. With the aid of the station transmission coil 5 the amplitude-modulated and amplified carrier signal AMCS, whose level has been influenced, if necessary, with the aid of the controllable resistance means 59, can be transmitted from the communication station 2 to the data carrier 1 in a contactless manner.

The communication station 2 further has demodulation means 61, with the aid of which a load-modulated carrier signal LMCS, produced by load demodulation by means of the load modulation stage 17 of the data carrier 1, can be demodulated. As a result of the demodulation with the aid of the demodulation means 61 the demodulation means 61 supply encoded data CDA, which are formed by, for example, an encoded data word CDW. The communication station 2 further has decoding means 62, to which the encoded data CDA, i.e. an encoded data word CDW can be applied and which effect decoding, as a result of which the decoding means 62 produce data DA on their output 63, which data may be formed, for example, by a data word DW transmitted to the communication station 2 as a transmission signal which corresponds to the representation signal RS. The data DA, i.e. the data word DW, can be applied to the station processing means 55, which process the data DA, i.e. the data word DW. When the station processing means 55 process a data word DW, which has been transmitted from the data carrier 1 to the communication station 2 as a transmission signal which corresponds to the representation signal RS, the station processing means 55 generate a first control signal CS1, which is applied to control signal processing means 65 of the communication station 2 via a connection 64. The control signal processing means 65 are adapted to process the first control signal CS1 and to generate a second control signal CS2 in dependence on the first control signal CS1. The control signal processing means 65 supply the generated second control signal CS2 to a control input 67 of the controllable resistance means 59 via a connection 66, as a result of which the resistance values that can be realized with the aid of the controllable resistance means 59 can be changed by means of the second control signal CS2. The transmission of the data word DW corresponding to the representation signal RS from the data carrier 1 to the communication station 2 is suitably effected automatically at given time intervals. However, it is alternatively possible that the temperature prevailing in the data carrier 1 is communicated to the communication station 2 in dependence on whether given temperature values are reached, in which case for example a so-called heat information bit in a data word DW is set to a given value when a temperature threshold value is exceeded.

When in the embodiment of the data carrier 1 and of the communication station 2 described with reference to FIG. 4 the detection means 28 in the data carrier 1 and in the integrated circuit 7 of the data carrier 1 detect an increase in temperature, this results in a corresponding representation signal RS, which in its turn leads to a corresponding transmission signal, i.e. a corresponding data word DW. This data word DW is transmitted to the communication station 1 with the aid of the initiation means 54 and is recovered with the aid of the demodulation means 61 and the decoding means 62 and is eventually processed with the aid of the station processing means 55, yielding a first control signal CS1 corresponding to the data word DW and a second control signal CS2 corresponding to the first control signal CS1 and, consequently, also to the data word DW. With the aid of the second control signal CS2 corresponding to the data word DW the controllable resistance means 59 are influenced, as a result of which it is achieved that the energy content of the communication signal AMCS transmitted from the communication station 2 to the data carrier 1 can be changed. As a matter of fact, the output resistance for the amplifier means 58 is adjusted with the aid of the controllable resistance means 59 in such a manner that in response to the increasing temperature in the data carrier 1 the energy content of a communication signal AMCS transmitted from the communication station 2 to the data carrier 1 is reduced, as a result of which the temperature rise in the data carrier 1 is counteracted rapidly and effectively.

Thus, in the embodiment of the data carrier 1 and of the communication station 2 shown in FIG. 4 a change of the temperature prevailing in the data carrier 1 and in the integrated circuit 7 is initiated in this data reduction circuit 1 and in this integrated circuit 7, while the means and measures for changing the temperature prevailing in the data carrier 1 and in the integrated circuit 7 are provided inside the communication station 2.

What is claimed is:

1. A data carrier (1)

adapted to provide contactless communication with a communication station (2) and including an integrated circuit (7) and including a direct voltage generation circuit (20), which serves to generate and to supply a d.c. supply voltage (V) for the data carrier (1), and including detection means (28) for detecting the temperature prevailing in the environment of the detection means (28) in the data carrier (1), with the aid of which detection means a representation signal (RS) representative of the prevailing temperature can be generated, and including initiation means (23; 32; 54) adapted to receive and to process the representation signal and adapted to initiate a change of the temperature in the data carrier (1).

2. A data carrier (1) as claimed in claim 1, in which the initiation means (23; 32; 54) are adapted to initiate a reduction of the temperature in the data carrier (1).

3. A data carrier (1) as claimed in claim 1,
in which an input circuit (24) having an input resistance has been provided, and
in which the initiation means (23; 32) are adapted to initiate a change of the input resistance of the input circuit (24).

4. A data carrier (1) as claimed in claim 1,
in which a transmission resonant circuit (11) for receiving a communication signal (AMCS) transmitted from the communication station (2) to the data carrier (1) has been provided, which circuit is tuned to a resonant frequency, and
in which the initiation means (32) are adapted to initiate a change of the resonant frequency of the transmission resonant circuit (11).

5. A data carrier (1) as claimed in claim 1, in which the initiation means (54) are adapted to support the transmission of a transmission signal (DW) corresponding to the representation signal (RS) from the data carrier (1) to the communication station (2).

6. A communication station (2) for the contactless communication with a data carrier (1) having detection means for generating a representation signal (RS) representative of a temperature prevailing in the data carrier (1) and having initiation means (54) for supporting the transmission of a transmission signal (DW) corresponding to the representation signal (RS) from the data carrier (I) to the communication station (2),
in which station processing means (55) for processing the received transmission signal (DW) have been provided, and
in which control means (59) which can be influenced by the station processing means (55) have been provided, with the aid of which control means the energy content of a communication signal (AMCS) transmitted from the communication station (2) to the data carrier (1) can be changed.

7. An integrated circuit (7) for a data carrier (1) for providing contactless communication with a communication station (2),
including a direct voltage generation circuit (20), which serves to generate and to supply a d.c. supply voltage (V) for the integrated circuit (7), and
including detection means (28) for detecting the temperature prevailing in the environment of the detection means (28) in the integrated circuit (7), with the aid of which detection means a representation signal (RS) representative of the prevailing temperature can be generated, and
including initiation means (23; 32; 54) adapted to receive and to process the representation signal and adapted to initiate a change of the temperature in the integrated circuit (7).

8. An integrated circuit (7) as claimed in claim 7, in which the initiation means (23; 32; 54) are adapted to initiate a reduction of the temperature in the integrated circuit (7).

9. An integrated circuit (7) as claimed in claim 7,
in which an input circuit (24) having an input resistance has been provided, and
in which the initiation means (23; 32) are adapted to initiate a change of the input resistance of the input circuit (24).

10. An integrated circuit (7) as claimed in claim 7,
in which a main component (10) for a transmission resonant circuit (11) for receiving a communication signal (AMCS) transmitted from the communication station (2) to the data carrier (1) has been provided, and
in which the main component (10) has a value which also determines the resonant frequency of the transmission resonant circuit (11), and
in which the initiation means (32) are adapted to connect or disconnect at least one additional component (40, 41, 42; 46, 47, 48) for the transmission resonant circuit (11) to the main component (10) for the transmission resonant circuit (11).

11. An integrated circuit (7) as claimed in claim 7, in which the initiation means (54) are adapted to support the transmission of a transmission signal (DW) corresponding to the representation signal (RS) from the integrated circuit (7) to the communication station (2).

* * * * *